United States Patent [19]

Crihfield

[11] Patent Number: 4,995,189

[45] Date of Patent: Feb. 26, 1991

[54] RATTLING FISH LURE

[76] Inventor: Michael W. Crihfield, 14101 Michoud Blvd., Apt. 504, New Orleans, La. 70129

[21] Appl. No.: 445,003

[22] Filed: Dec. 4, 1989

[51] Int. Cl.⁵ ............................................. A01K 85/00
[52] U.S. Cl. ..................................... 43/42.31; 43/44.9
[58] Field of Search ................ 43/42.31, 42.24, 42.29, 43/42.35, 44.9

[56] References Cited

U.S. PATENT DOCUMENTS

| | | | |
|---|---|---|---|
| 2,270,487 | 3/1926 | Withey | 43/42.31 |
| 3,468,053 | 9/1969 | Lux | 43/42.31 |
| 3,848,353 | 11/1974 | McClellan | 43/42.31 |
| 3,854,233 | 12/1974 | Browning, III | 43/42.29 |
| 3,908,298 | 9/1975 | Strader | 43/42.31 |
| 3,935,660 | 2/1976 | Plew | 43/42.31 |
| 4,008,539 | 2/1977 | Gardner | 42/42.31 |
| 4,817,326 | 4/1989 | Benjestorf | 43/44.9 |

Primary Examiner—Richard K. Seidel
Assistant Examiner—James Miner
Attorney, Agent, or Firm—David L. Ray

[57] ABSTRACT

A noise making fishing lure including a two piece plastic shell assembly having two chambers therein. Each chamber contains a plurality of metal spheres which move as the lure is pulled through the water. The lure has an internal sleeve therein for receipt of a fishing line. The lure of the invention can be connected and used in conjunction with conventional fishing lures and enhance the fish luring capability of an existing fishing lure by the addition of a noise production element. The rattling fish lure of the present invention may be inserted into other artificial lures such as plastic worms, by cutting the worm to provide access for the rattling lure. The two piece shell assembly is made of plastic and can be manufactured in any desired color to be incorporated into or used with almost any type of fishing lure or rigging.

15 Claims, 2 Drawing Sheets

RATTLING FISH LURE

BACKGROUND OF THE INVENTION

1. Field of the Invention

The present invention is related to fishing lures. In particular, the present invention is related to noise making fishing lures.

2. Description of the Prior Art

It is well known that many species of fish are attracted to sound waves and vibrations. Many of the artificial fish lures presently being utilized lack the ability to produce sound waves as the lures are being retrieved. However, noise making fishing lures and noise making attachments to fishing lures are known in the art. Exemplary of such lures and attachments are those described in the following U.S. Pat. Nos.:

U.S. Pat. No. 4,008,539 discloses a noise making slip sinker including a shell having a distal end which is open and a proximal end with an aperture therein. A guide plug made of lead is sealingly received within the distal end of the shell and has an elongated guide portion extending to and sealingly received by the proximal end of the shell. The guide plug has a passageway which extends the length of the guide plug from the aperture in the proximal end of the shell to a point located outside of the distal end of the shell, and at least one rigid ball is contained within the space between the guide portion of the guide plug and the interior wall of the shell.

U.S. Pat. No. 3,935,660 discloses a noisemaking device for use with a fishing lure or bait and a method of making the device including a container formed of two flanged deep cups held together by a length of heat-shrinkable tubing and loosely containing one or more metal balls. The device may be molded into an artificial lure or may be attached directly to a fish hook or wire harness for use with an artificial lure or live bait.

U.S. Pat. No. 3,854,233 discloses a fishing lure having a soft rubber or plastic tail component. A stainless steel wire extends axially through a closed end of a generally tubular lure and is shiftable longitudinally within the lure. The leading end of the wire is connected to a fishing line and the trailing end has a transversely bent tip to which the tail component can be impaled and then pulled partially into the tubular lure body. A hook bearing member is attached to the wire and trails the lure with the hook thereon adapted to the embedded in the tail component.

U.S. Pat. No. 3,848,353 discloses a rattle sounder for fishing lures including a hollow shell of bullet shaped external contour having an integral cylindrical tube extending therethrough. The torus shaped interior of the shell has plural small spherical shot loosely disposed therein to rattle when shaken. The shell can be mounted alternatively around a wire of a safety pin type of lure and hook assembly; or around a leader above a hook. It may also be mounted around a rubber band stretched between the eye of a lure assembly and the barb of the hook on the assembly. A small plate has one hole for connection to the rubber band and the another hole for engagement with the hook barb in the latter instance. A modification places nut-like hexagonal slugs in a cavity in a plastic housing with an axial hole through the housing to pass a line or lure wire through the housing and slugs.

U.S. Pat. No. 3,468,053 discloses a sound producing device for fishing including a unit secured to the lower end of a fishing line and including a hollow receptacle disposed upon a shaft, the lower end of which rides upon the ocean floor. Pellets are placed within the receptacle which moves about to produce a rattling sound for attracting fish in deep water trolling.

SUMMARY OF THE INVENTION

In accordance with the present invention there is provided a noise making or rattling fishing lure including a two piece plastic shell assembly having two chambers therein. Each chamber contains a plurality of metal spheres which move and rattle as the lure is pulled through the water. The lure has an internal sleeve therein for receipt of a fishing line. The lure of the invention can be used in conjunction with conventional fishing lures and enhance the fish luring capability of an existing fishing lure by the addition of a noise production element. The rattling fish lure of the present invention may be inserted into other artificial lures such as plastic worm, by cutting the worm to provide access for the rattling lure. The two piece shell assembly is made of plastic and can be manufactured in any desired color to be incorporated into, or used with, almost any type of fishing lure or rigging.

BRIEF DESCRIPTION OF THE DRAWINGS

The invention will be more clearly understood by reference to the drawings in which.

DESCRIPTION OF THE PREFERRED EMBODIMENTS

Figure 3:
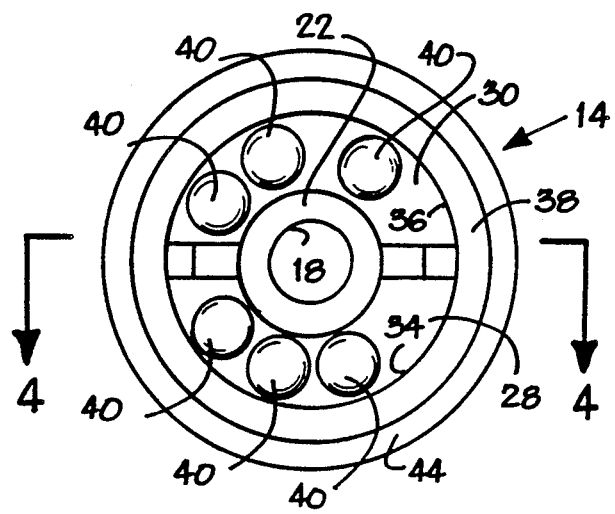
FIG. 3 is a top plan view of the base portion of FIG. 2.
Figure 4:
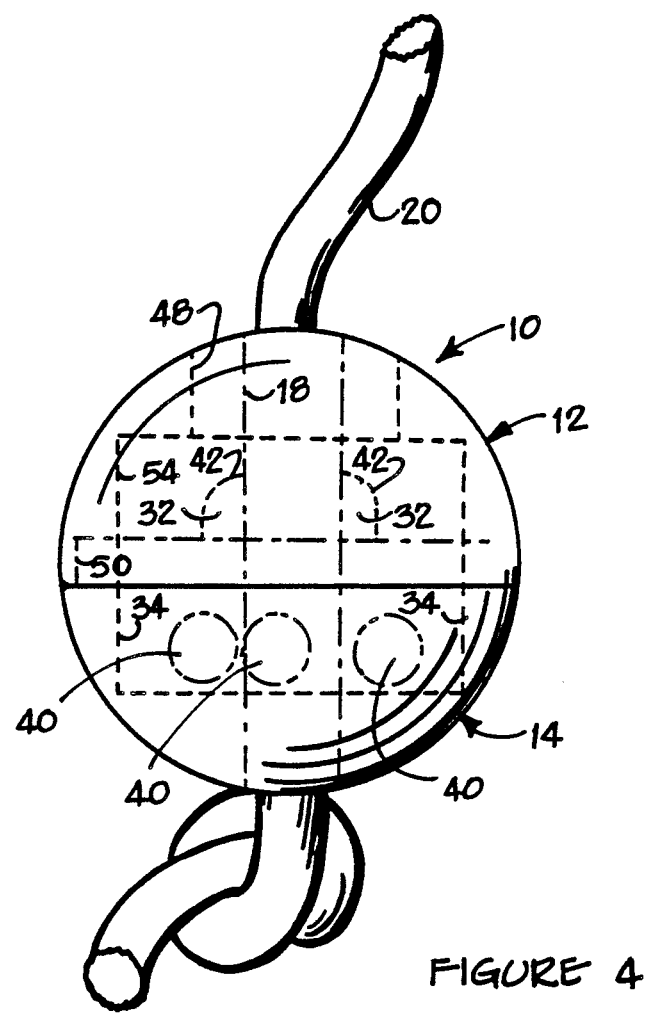
FIG. 4 is a plan view of the lure of the invention having a fishing line extending therethrough with phantom lines indicating the interior of the shell assembly as viewed along lines 4—4 of FIG. 3.
Figure 5:
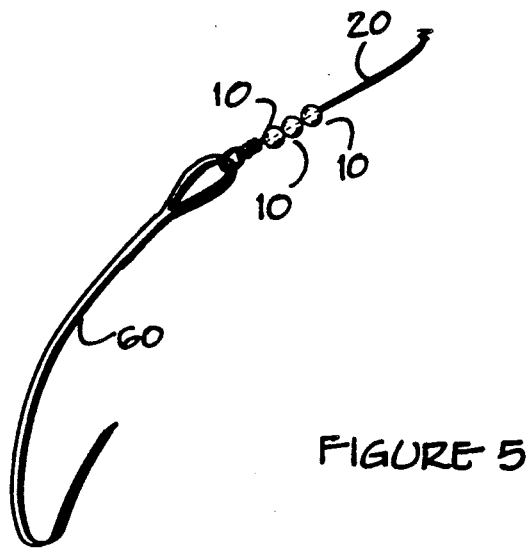
FIG. 5 is a perspective view of three of the lures of the invention having a fishing line threaded therethrough which is tied to a fish hook.

Referring now to the drawings and in particular to FIG. 4, the rattling fish lure of the present invention is shown in FIGS. 4 and 5 and is generally indicated by the numeral 10. As can be seen in FIGS. 4 and 5, lure 10 is a sphere assembled from a cap portion generally indicated by the numeral 12 in FIG. 1 and a base portion generally indicated by the numeral 14 in FIGS. 2 and 3.

Figure 2:
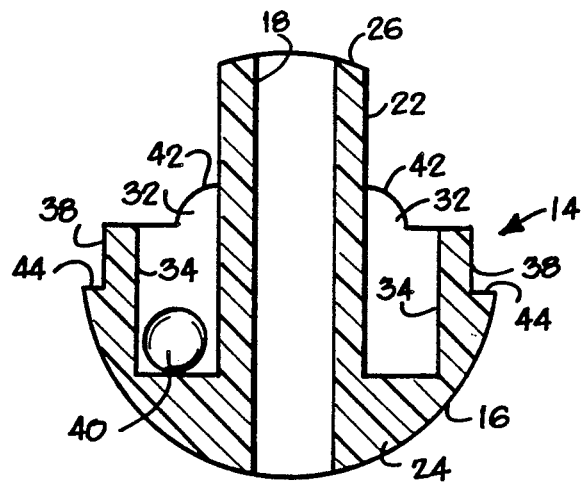
FIG. 2 is a cross-sectional, side plan view of the base portion of the shell assembly of the present invention drawn to the same scale as the cap portion of FIG. 1 having one metal sphere placed therein.

As can be best seen in FIGS. 2 and 3, base portion 14 has a generally hemispherical outer surface 16 and a hollow cylindrical channel or sleeve 18 extending axially through the center of base portion 14. Sleeve 18 is utilized for threading a fishing line 20 through the assembled lure 10 as shown in FIGS. 4 and 5.

Sleeve 18 is partially formed in post 22 which extends upwardly from the bottom portion 24 of base portion 14. Post 22 is a hollow cylindrical post having side walls 26.

A hollow chamber 28 as best seen in FIG. 3 surrounds approximately one half of post 22 and a corresponding chamber 30 surrounds the other half of post 22. A wall or partition 32 separates chamber 28 from chamber 30. The outer wall 34 of chamber 28 and the outer wall 36 of chamber 30 is formed from base 24 of cap portion 14 and by collar 38 which extends annularly around post 22.

Thus, chambers 28 and 30 are formed for receipt of metal spheres or ball bearings 40 as shown in FIG. 3. Ball bearings 40 are sized to fit loosely within chambers 28 and 30 and to move freely therein to make a rattling noise attractive to fish. Wall 32 has a shoulder 42 thereon which is sized so that ball bearings 40 from chamber 28 or 30 will not pass over the top of wall 32 and commingle with the ball bearings in the adjacent chamber.

Extending annularly around base portion 14 is lip 44. Lip 44 is utilized to form a seal with cap portion 12. Preferably, the seal formed between cap portion 12 and base potion 14 is watertight so that no water enters chambers 28 or 30. If water ever were to enter chambers 28 or 30, the metal sphere 40 would not produce the desired sound.

Figure 1:
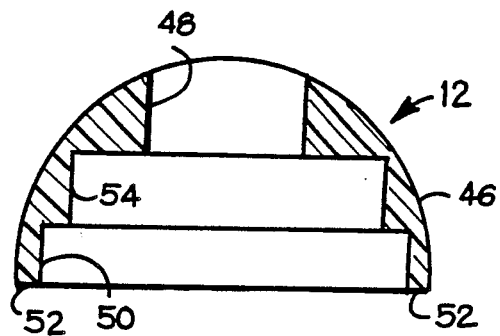
FIG. 1 is a cross-sectional, side plan view of the cap portion of the shell assembly of the invention.

Referring to the FIG. 1, cap portion 12 can be seen to have a generally hemispherical skin 46 which when combined with attached base portion 14 forms a hemisphere. Cap portion 46 has a cylindrical chamber 48 therein for receipt of post 22. A lower cylindrical cavity 50 is dimensioned to form a snug or force fit with collar 38 when cap portion 12 is forced onto to base portion 14. Furthermore, lower cylindrical cavity 50 has a height which corresponds to the height of collar 38 so that the lip portion 52 of cap portion 12 will seal against lip 44 of base portion 14 when cap portion 12 is force fitted onto base portion 14.

An intermediate cavity 54 is formed in cap portion 12. Intermediate cavity 54 contains upwardly extending shoulder 42 of wall 32.

To assemble the lure 10 of the present invention, preferably three steel ball bearings 40 are inserted into cavity 30 and preferably three ball bearings are inserted into cavity 28 while holding base portion 14 with post 22 pointing upward in the position indicated in FIG. 2. Cap portion 12 is then forced downwardly onto base portion 14 and forced fitted thereon to achieve a water tight seal. The two portions are assembled to form a sphere which locks tightly together without the necessity of gluing or using other means for fastening the two portions together. The lure of the present invention is then utilized as indicated in FIGS. 4 and 5. A fishing line 20 may be inserted into sleeve 18 which extends completely through lure 10 and a knot may be tied as indicated in FIG. 4 and FIG. 5. In FIG. 5 the lure of the invention is shown connected directly to a single fish hook.

If desired, the lure of the present invention can be attached to conventional artificial baits such as plugs, figs, spinner baits and the like. The fish hook 60 shown in FIG. 5 could have a common plastic worm or other fish luring device attached thereto. The spherical lure of the present invention adds the element of sound to a conventional artificial bait or fish hook, thus, increasing the chances of success for the fisherman.

Although the preferred embodiments of the present invention have been disclosed and described in detail above, it should be understood that the invention is in no sense limited thereby, and its scope is to be determined by that of the following claims:

What is claimed is:

1. A rattling fishing lure comprising:
    a. a partially hollow cap member having a generally hemispherical exterior,
    b. a plurality of metal spheres,
    c. a partially hollow base member having a generally hemispherical exterior, said base member having chamber means therein for containing said metal spheres for making sound waves in water attractive to fish, said chamber means having wall means therein which divides said chamber means into two equal parts, said base member and said cap member being force fitted together to form a partially hollow sphere which contains said metal spheres therein for producing sound waves in water attractive to fish, said base member having sleeve means therein for receipt of a fishing line.

2. The rattling fish lure of claim 1 wherein said wall means has shoulder means thereon for preventing said small metal spheres from traveling between said equal parts of said chamber.

3. The rattling fishing lure of claim 2 wherein said hollow cap member means has an intermediate cylindrical cavity therein for receipt of said shoulder means.

4. The rattling fish lure of claim 1 wherein said two equal parts of said chamber contain equal numbers of metal spheres.

5. The rattling fish lure of claim 4 wherein six metal spheres are contained in said lure.

6. The rattling fishing lure of claim 7 wherein said base member and said cap member are force fitted together to form a water tight seal.

7. The rattling fishing lure of claim 1 wherein said base member means has post means therein which is force fitted into chamber means in said cap portion.

8. The rattling fish lure of claim 7 wherein said post means forms a watertight seal with said chamber means in said cap portion.

9. The rattling fishing lure of claim 7 wherein said hollow cap member has a cylindrical cavity means therein for receipt of annular collar means connected to said base member means.

10. A rattling fishing lure comprising:
    a. a partially hollow cap member having a generally hemispherical exterior, a cylindrical cavity means in the lower portion thereof, and a cylindrical chamber means in the upper portion thereof,
    b. a partially hollow base member having a generally hemispherical exterior, said base member having chamber means therein containing metal spheres for making sound waves in water, said chamber means having wall means which divides said chamber means into two equal parts, said wall means having shoulder means thereon for preventing said small metal spheres from traveling between said equal parts of said chamber, said base member and said cap member being force fitted together to form a partially hollow, watertight sphere which contains said small metal spheres therein for producing sound waves attractive to fish, said base member having sleeve means therein for receipt of a fishing line.

11. The rattling fishing lure of claim 10 wherein said cylindrical cavity means is adapted to receive annular collar means connected to said base member means.

12. The rattling fish lure of claim 10 wherein said two equal parts of said chamber contain equal numbers of metal spheres.

13. The rattling fish lure of claim 12 wherein six metal spheres are contained in said lure.

14. The rattling fishing lure of claim 10 wherein said base member means has post means therein which is force fitted into chamber means in said cap portion.

15. The rattling fish lure of claim 14 wherein said post means forms a watertight seal with said chamber means in said cap portion.

* * * * *